Fig. 1

Patented Nov. 10, 1931

1,830,876

UNITED STATES PATENT OFFICE

JOHN G. KAY AND LOUIS C. SCHEURING, OF DETROIT, MICHIGAN, ASSIGNORS TO AINSWORTH MANUFACTURING CORPORATION, OF DETROIT, MICHIGAN, A CORPORATION OF MICHIGAN

CUTTING-OFF MACHINE

Application filed April 17, 1930. Serial No. 445,121.

This invention relates to cutting off machines and more particularly to machines for cutting short or long lengths of tubing, channels or the like, made of metal, heavy fiber or similar material.

It is an object of this invention to provide a cutting off machine which will cut off a length of a continuously fed tubing, dropping the cut off lengths into a work receiving container.

A further object is to provide a machine of this character which is accurate in its performance and which can be adjusted to various lengths of tubing.

A further object is to provide a cutting off machine in which the cutter moves along with the work before and during the cutting stroke.

A still further object is to provide a cutting off machine for tubing which will not crush the ends of the tubing and in which the work, as it is fed, controls the cutter so that accuracy can be maintained.

A further object of this invention is to provide a clutch of novel design which is superior in operation to clutches heretofore used in devices of this character.

It is a further object to provide a cushioning device for cushioning the bolster of the machine in its return stroke.

A further object is to provide an interlock between certain of the operating parts of the machine so that a predetermined sequence of operation will be maintained.

Still further objects will readily occur to those skilled in the art upon reference to the following description and the accompanying drawings in which.

Operation

The operation of the machine will first be described generally. The work, as it comes from the rolling mill in the shape of a tube or channel, passes through feed rolls shown to the right of Fig. 1, and into the slidable bolster of the cutting off machine. The forward end of the work abuts a stop on the bolster and causes the latter as well as the cutter itself, to travel forward, the work being continuously forward fed. After the bolster has traveled forward a certain distance, a clutch trip mechanism operated thereby causes clutch faces to engage, consequently causing rotation of the drive shaft and forcing the cutter downwardly into cutting engagement with the work.

The drive shaft, in its rotation, carries along with it a valve cam which, by means of appropriate linkage, opens a valve, admitting air to a cylinder in which a piston is located and causing the return of the bolster to its first or work receiving position. On the return stroke of the bolster a valve trip cam operated thereby operates a valve trip rod to close the valve aforementioned, cutting off the supply of air to the bolster return cylinder. In the meantime, the clutch has been returned to its normal or disengaged position and is ready to be again operated by its trip rod in a heretofore described manner.

Work supporting means and work clamping means, appropriately operated, are carried by the machine, and the latter is provided with a dash pot or back stop to prevent too rapid return of the bolster.

If desired, the machine may be and preferably is provided with a device which will prevent the work from causing the bolster to travel too far forwardly. The machine may also be provided with a hose for blowing off the chips around the cutter.

The above described operation is, of course, repeated continuously and with great rapidity so that the machine is capable of cutting off pieces of tubing at a great rate of speed.

The operation and construction of the various parts of the machine will now be described in detail.

Figure 1:
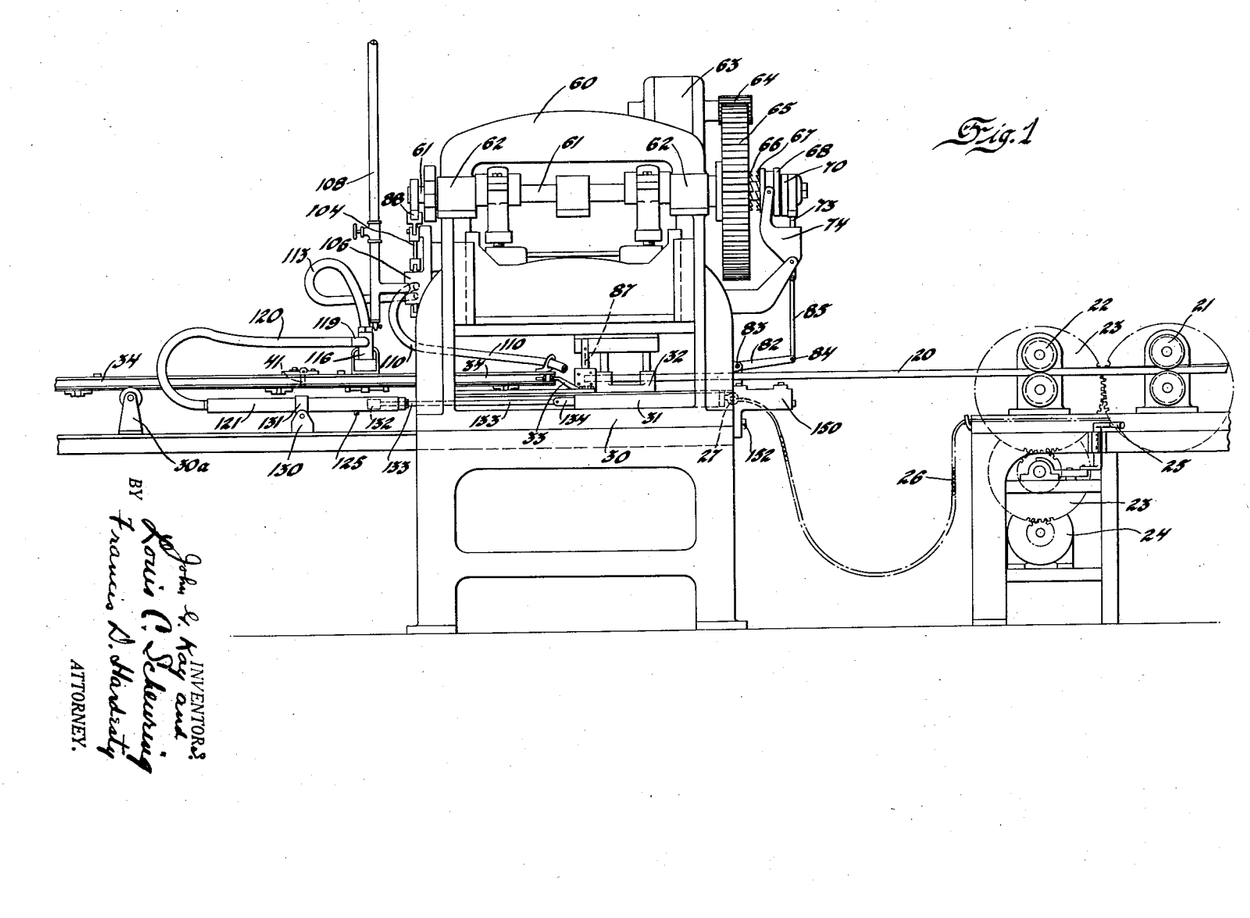
Fig. 1 is a front view of the cutting off machine, together with the associated feed rolls, and part of the tube forming machine.
Figure 2:
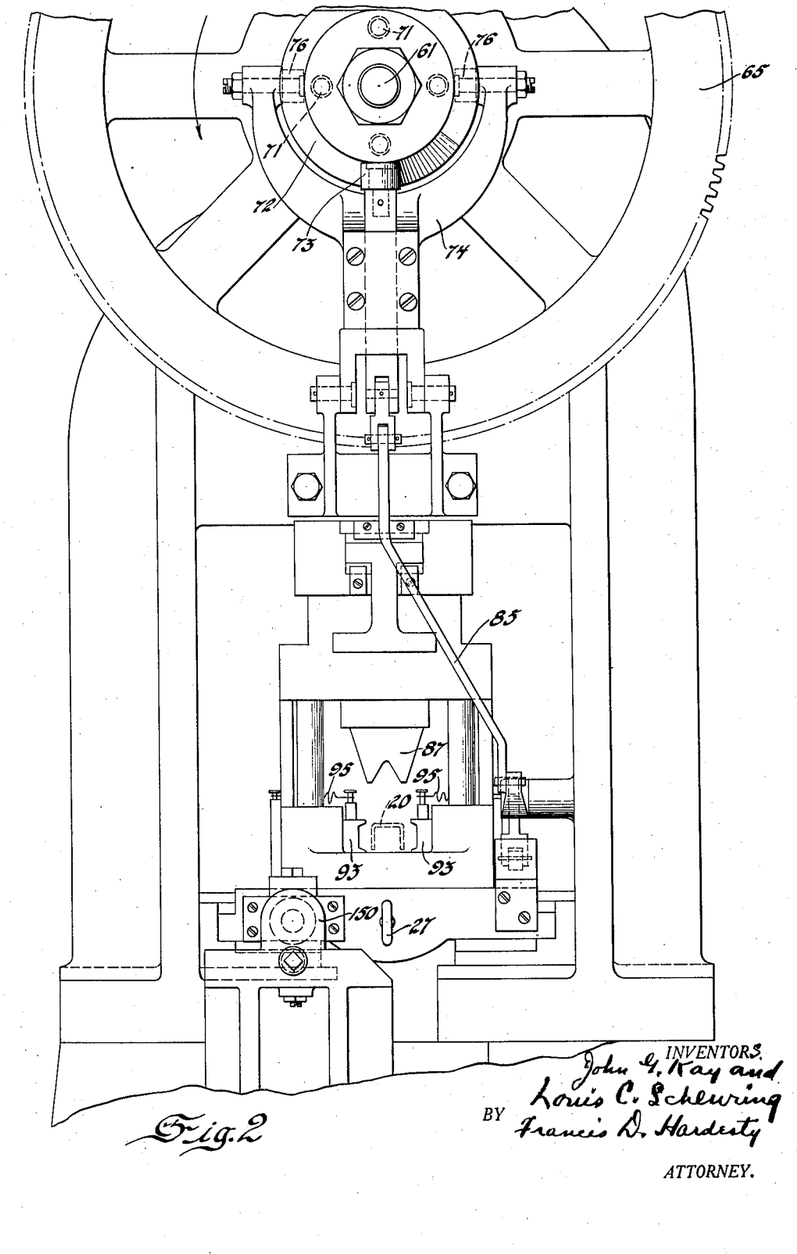
Fig. 2 is a side view of the cutting off machine from the right of Fig. 1.

Feed rolls (Fig. 1)

The work 20 as it comes from the last forming rolls 21 goes through a pair of feed rolls 22 operated by means of gearing 23 connected to a continuously rotating motor 24. A handle 25 controls the clutch (not shown) connecting the motor and the gearing and when the handle is in the position shown in Fig. 1 the feed rolls will rotate and the work will be continuously forwardly fed. When the handle is thrown to the left the feed rolls will no longer rotate and the work will no longer be fed forwardly. A safety cord or chain 26 is attached at one end to an eye bolt 27 on the sliding bolster of the machine and at the other end to the handle 25, and it will be observed that if the cord 26 is pulled taut by virtue of the bolster's having been forced too far forwardly on the machine, handle 25 will be thrown to the left, stopping feeding of the work 20, and further movement of the bolster.

Bolster and stop. (Figs. 3—9—10—11)

Figures 12, 13:
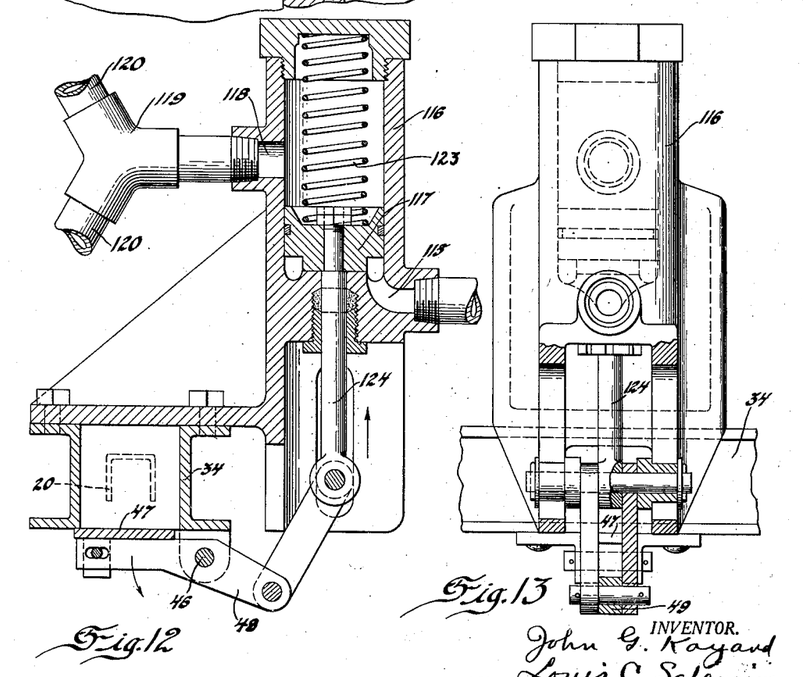
Figs. 12 and 13 show a by-pass valve and portions of a work supporting mechanism.

On the bed 30 of the machine and on the roller 30a is the bolster 31, slidable therein from left to right and vice versa and carrying thereon a die shoe 32. At the forward end of the bolster by means of brackets 33, riveted to the bolster, a stop rack 34 is carried. The latter comprises a pair of opposed channeled members 35 having in their surfaces aligned apertures 36 pairs of which can be selected for the reception of bolts 37 which secure the stop 38 to the stop rack 34. As will be seen, the stop 38 is adjustably mounted along the length of the stop rack 34 to adapt the machine to cut off long or short pieces of tubing. The stop includes a U shaped plate 40 adapted to be bolted to the stop rack 34 and carries a swinging stop 41 mounted on trunnions 42 and held against the work by means of the spring 43. A bar 44 straddling the legs of the U shaped plate and secured thereto carries a leaf spring 45 shown best in Figs. 8 and 9, to direct the forward end of the completed work downward. Hingedly secured at 46 to the under side of the stop rack 34 is a gate 47, operable by the bell crank 48 (Fig. 12) and having a plurality of apertures 49 cooperating with a pin 50 secured to the lower edge of the stop 38 to prevent movement of the latter when the gate is in the full line position of Fig. 11, the stop 38 being movable on its axis by the work 20 when the gate 47 is lowered to the dotted line position of Fig. 11.

Clutch and drive (Figs. 1, 2, 4, and 5)

In the frame 60 of the machine, a crank shaft 61 mounted on bearings 62 is adapted to rotate to cause movement of the cutter in a manner common to punch presses and machines of this character. Mounted on the frame 60 of the machine is a continuously rotating motor 63 having a pinion 64 thereon, which engages gear 65 to cause continuous rotation of the latter on the crank shaft 61. The gear 65 carries a clutch face 66 adapted to be engaged by a corresponding clutch face 67 on the sliding clutch collar of block 68. The latter is keyed against rotary movement with respect to the crank shaft 61 but is slidable thereon. Fixed on the crank shaft 61 against all movement with respect thereto, is the clutch cam abutment or block 70 having springs 71 which are adapted to force the sliding clutch block forwardly along the crank shaft and into engagement with the clutch face 66 on the gear 65. A cam 72 is adapted to cooperate with a pin 73 carried by the bracket or fork 74 the latter being movable with the sliding clutch block 68 from the full line position of Fig. 5 to the dotted line position.

The cam 72 rises from 72a to 72b, is "high" from 72b to 72a, and is cut away from 72c to 72a. As will be seen the cam in its rotation first forces the pin 73 and bracket 74 from the full line position to the dotted line position of Fig. 5, then holds the pin and bracket in the last mentioned position, thereby holding the clutch face 67 out of engagement with the face 66, and then upon release of the pin springs 71 force the bracket to the left or full line position thereby causing the clutch faces to engage. A spring 75 constantly urges pin 73 into engagement with cam 72, as will be seen. The bracket or fork 74 carries a pair of fingers 76 permanently engaging the sliding clutch block 68 in the groove 77 of the latter.

The bolster 31 carries at its rear end a cam 80 adapted to cooperate with a bell crank pivoted at 81 on the lever 82, the latter being pivoted to the frame of the machine at 83. At one end 84 of the lever 82 there is attached an end of the clutch trip rod 85, the latter being also attached to the pin 73. The operation of the clutch and drive is as follows:

When the cutter carrying bolster 31 has been moved forwardly by the work 20 cam 80 causes lever 82 to rock on its pivot 83 exerting a downward pull on the clutch trip rod 85 which pulls down the pin 73 of the clutch against the spring 75. The bracket 74 is now free to move along with the slidable block 68, springs 71 causing movement of the latter towards the clutch face 66 on the gear 65. The latter, being continuously rotated by the motor 63 and pinion 64, causes rotation of the sliding clutch block 68 and crank shaft 61, being keyed thereto, rotates, thereby causing the cutter blade 87 to be forced down and into cutting engagement with the work 20. Shaft 61 in its rotation carries along with it cam 88, shown in Fig. 3, to operate a valve in a manner hereinafter described.

*Work clamps (Figs. 1, 7 and 8)*

Figures 5, 6, 7:
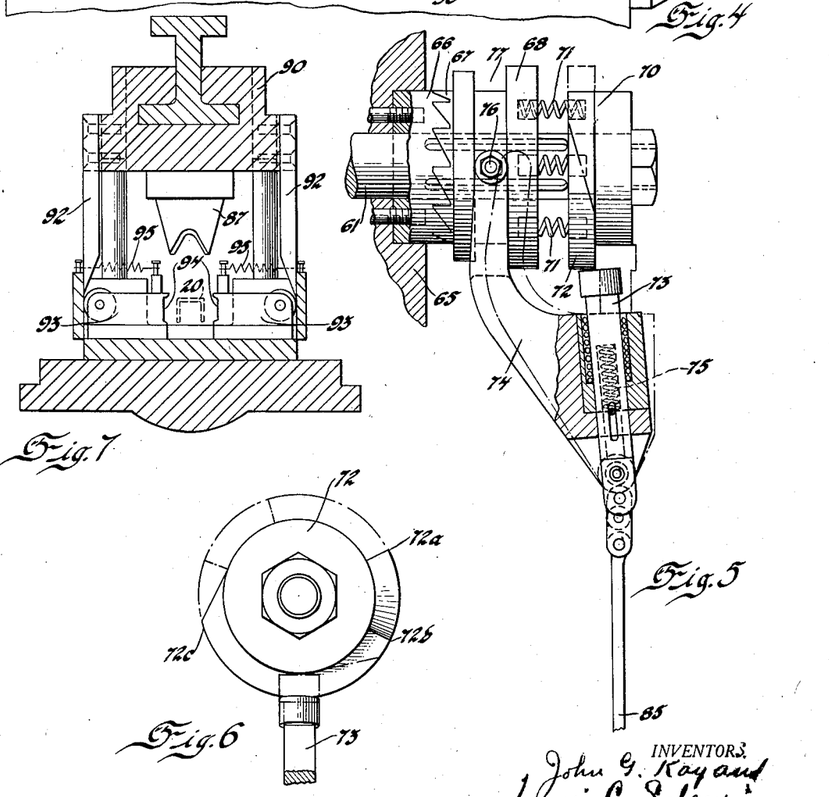
Fig. 5 is a view of the clutch and clutch trip rod.
Fig. 6 is a view of the clutch cam.
Fig. 7 is a detail view of the cutter and work clamping mechanisms.
Figure 8:
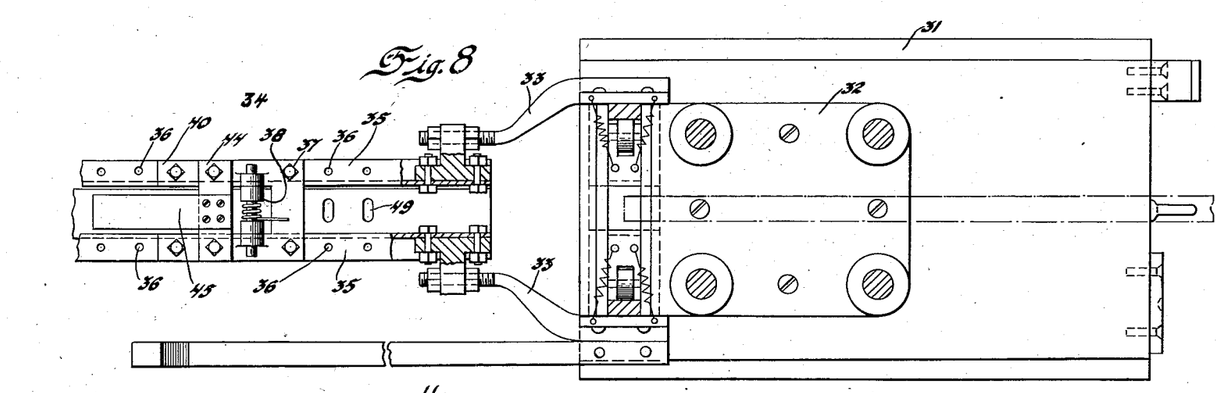
Fig. 8 is a plan view of the bed, bolster, die shoe, and stop rack.
Figure 9:
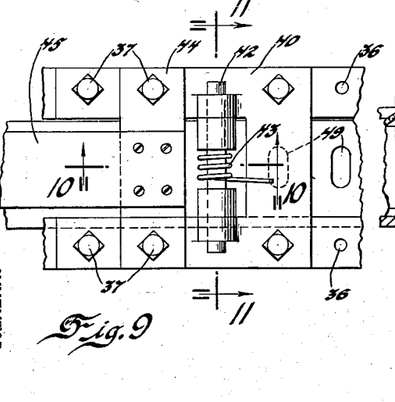
Fig. 9 is a plan view of the stop.
Figure 10:
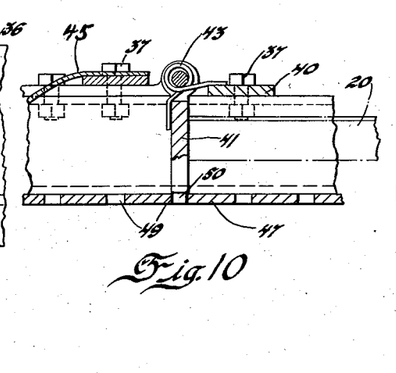
Fig. 10 is a section on the line 10—10 of Fig. 9.
Figure 11:
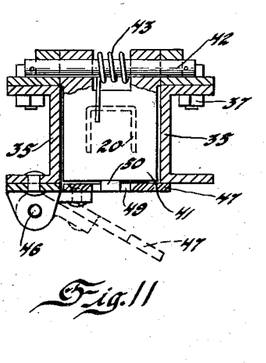
Fig. 11 is a section on the line 11—11 of Fig. 9.

When the frame member 90 carrying the cutter blade 87 is forced downwardly by the crankshaft 61 in the manner above described, cams 92 carried thereby cause work clamps 93 to move inwardly towards the work 20, clamping the latter by means of their clamping faces 94. When the crank shaft 61 is further rotated so as to elevate the cutter blade 87 and consequently cams 92, springs 95, normally exerting a pull on work clamps 93, cause the latter to withdraw from the work 20 permitting a free movement thereof.

*Bolster return (Figs. 1, 3, 4, 12 and 13)*

Figure 3:
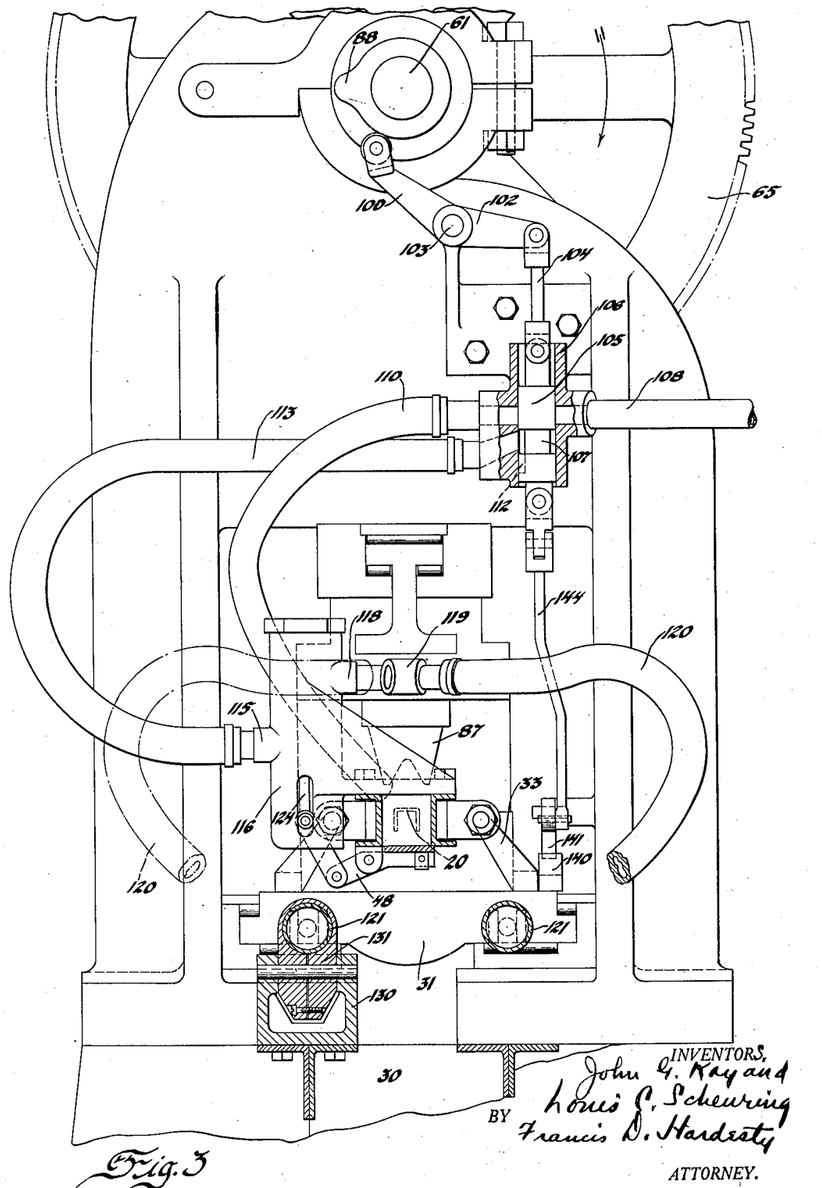
Fig. 3 is a side view of the cutting off machine from the left of Fig. 1, parts being shown in section.
Figure 4:
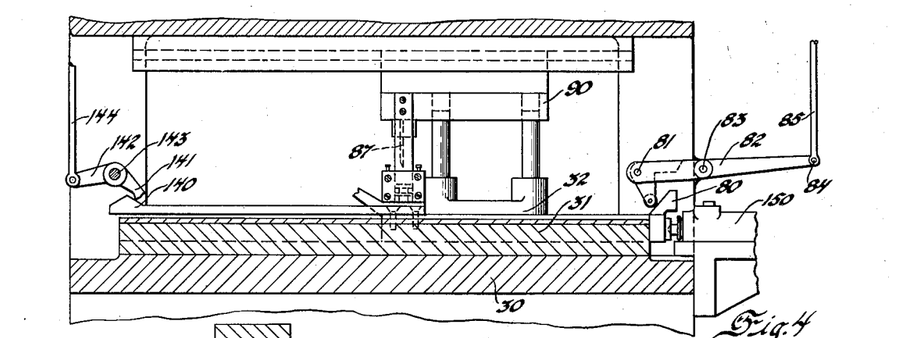
Fig. 4 is a view, partly in section, of the bolster, tripping mechanisms also being shown.

Crank shaft 61 in its rotation, carries along with it a cam 88, Fig. 3, which engages the end 100 of the bell crank 102, pivoted at 103, to exert an upward pull on valve rod 104, causing piston valve 105 to be moved upward in valve cylinder 106, from the position it is shown as occupying to a position wherein the cut away portion 107 of the valve 105 will be in line with the air supply pipe 108 and the work blower hose 110. Compressed air from the pipe 108 goes past the cut away portion 107 of the valve 105 and into the work blower hose 110 to the work 20 near the cutter blade 87, blowing chips and dirt away from the latter.

The valve 105 is also provided with a slot or kerf 112, communicating with the space around the cut away portion 107 and with the bolster return hose 113, when the valve is in its "up" position, to permit air from the pipe 108 to enter the bolster return hose 113. The latter communicates with the by pass valve 116 at the entrance port 115, provided with a piston 117 and an exhaust port 118, to which is attached a Y coupling 119, the branches of which are connected to hoses 120, each of which supply air to the bolster return cylinders 121.

Air from the hose 113 enters the valve 116 thru port 115 and forces the piston 117 upwardly (Fig. 12) against the spring 123, until the port 118 is uncovered. Air then escapes thru port 118, Y coupling 119 and thru the hoses 120 to the bolster return cylinders 121.

In its upward travel, piston 117 carries along a piston rod 124, which rocks bell crank 49 and opens gate 47, permitting the cut off piece of work to drop out of the stop rack 34 and into a work receiving bin below.

Supported in brackets 130 and clamps 131 on the bed 30 of the machine, forwardly of the bolster 31, are a pair of bolster return cylinders 121 having exhaust ports 125, and in which reciprocate pistons 132 and piston rods 133. The latter, at their rear ends, are rigidly attached to the bolster as at 134, so that movement of the bolster 31 causes movement of the piston 132, and movement of the piston causes movement of the bolster, when as above described, air from supply pipe 108 goes thru valve 106, hose 113, by pass valve 116, Y coupling 119, and hoses 120, into cylinders 121, and against pistons 132, the latter will in turn cause the bolster 31 to return to its rear or work receiving position.

On its return stroke, the bolster carries a valve trip cam 140 past the end 141 of the bell crank 142 which thereby rocks on its pivot 143 to exert downward pull on valve trip rod 144 to return piston valve 105 from its "up" position to the position it is shown as occupying in Fig. 3. In this manner the return of the valve to its normal position shutting off the supply of air to the bolster return cylinders 121 is positively assured.

Figure 14:
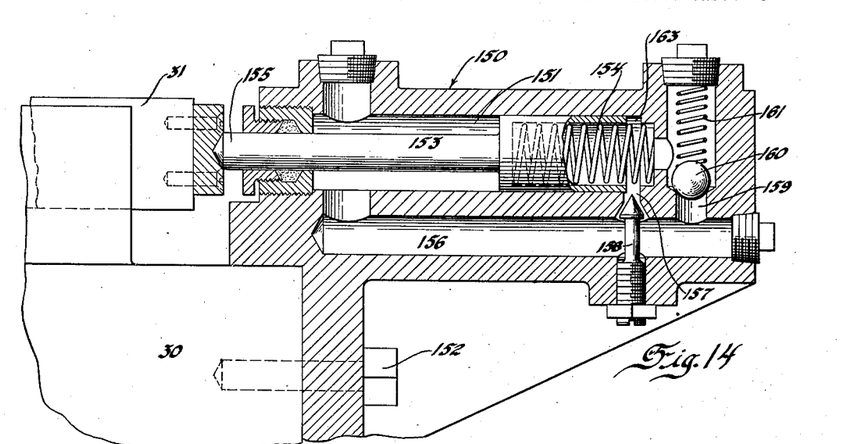
Fig. 14 shows a dashpot or bolster return stop.

*Dash pot (Figs. 1 and 14)*

In order to prevent the bolster 31 from being returned too far rearwardly of the machine and in order to take the strain of stopping off the bolster return piston rod 133, means, shown at 150, forms an abutment for the rear end of the bolster to stop further movement thereof. The means 150 is in the nature of a dash pot and, as shown best in Fig. 14, includes a chamber 151, secured to the end of the machine by means of the bolts 152, and plunger 153 slidable in the cylinder 151 and normally pressed outwardly by spring 154 and adapted to be engaged at its further end 155 by the rear end of the bolster 31. Surrounding the plunger 153 and in the passage 156 adjacent thereto is a body of liquid, preferably oil, adapted to form a cushion. A port 157, whose opening is regulated by the needle valve 158, and a second port 159 closed by a ball check valve 160 connect the passage 156 and the plunger cylinder at their rear ends. When the bolster returns, it strikes the plunger 153, causing the liquid behind the latter to be forced out slowly through the port 157 and around the valve, the escaping liquid flowing into the passage 156. When the bolster starts to travel forwardly, the plunger is spring pressed forwardly and the body of liquid ahead of the plunger is forced through the port 159 and by the ball check 160 against the spring 161, and into the space 163 behind the plunger 156. It will be obvious that the only escape for liquid from behind the plunger 156 when the latter is returning on the bolster return stroke, is through the restricted opening in the port 157 and that therefore the plunger 156 cannot move back very quickly. Consequently bolster 31 in its return stroke cannot return at a very great rate of speed, its action being retarded by the plunger 156.

It will be seen therefore, that I have provided a novel cutting off machine, one that is adapted to receive work that is continuously forwardly fed, as contrasted with machines of this character in which the work is intermittently forwardly fed.

It will also be observed that I have provided a machine and parts thereof, designed to perform accurately, economically, and at a very great rate of speed.

Now having described the invention and the preferred embodiment thereof, it is to be understood that the said invention is to be limited, not to the specific details herein set forth, but only by the scope of the claims which follow:

1. A machine for cutting off lengths from continuously fed work which comprises feed rolls, a movable work stop, a cutter movable by and operable by said work stop, means operable upon forward movement of said work stop to cause the return of the latter and work ejecting means responsive to said work stop returning means.

2. In a machine for cutting off lengths from continuously fed work, a movable work stop, forward movement of which is caused by movement of the work, work cutting means responsive to forward movement of said stop, means responsive to movement of said cutter to return said stop to its work receiving position, and means responsive to movement of said stop return means to eject said work.

3. In a machine for cutting off lengths from continuously fed work, the combination of work feeding means, a movable work stop, a cutter movable by and operable by said work stop, means responsive to movement of said cutter for causing movement of said work stop, and means responsive to said second mentioned means for causing the ejection of said work.

4. In combination, feed rolls, a control therefor, a sliding work stop, and a connection between said work stop and said control whereby overtravel of said work stop will cause said control to stop said feed rolls.

5. A work support comprising side members, a work stop adjustably secured thereto and disposed between said side members, and a bottom plate for said support, movement of said stop being controlled by movement of said plate.

6. In a work cutting machine a cutter and a work support comprising side members, a work stop and a bottom plate, movement of said stop being controlled by movement of said plate, and movement of said plate being controlled by said cutter.

7. In a machine for cutting off lengths from continuously fed work which comprises (a) work feeding means, (b) a stationary frame having thereon a drive shaft, a cutter block movable vertically by said shaft, a continuously rotating element, a single impulse clutch for momentarily establishing an operative connection between the drive shaft and the element, (c) a horizontally slidable bolster in said machine having a work stop and a vertically movable cutter thereon, (d) means automatically operable by said bolster after it has been advanced by the work to establish the clutch connection between the element and the shaft, so as to cause the cutter block to descend and to cause the cutter to cut off the work, and (e) means automatically operable by the drive shaft when it rotates to cause return of said bolster.

8. In a machine for cutting off lengths from continuously fed work which comprises (a) work feeding means, (b) a stationary frame having thereon a drive shaft, a cutter block movable vertically by said shaft, a continuously rotating element, a single impulse clutch for momentarily establishing an operative connection between the drive shaft and the element, (c) a horizontally slidable bolster in said machine having a work stop and a vertically movable cutter thereon, (d) means automatically operable by said bolster after it has been advanced by the work to establish the clutch connection between the element and the shaft, so as to cause the cutter block to descend and to cause the cutter to cut off the work, and (e) means automatically operable by the drive shaft when it rotates to cause return of said bolster, and means automatically operable by the bolster on its return stroke to destroy the effectiveness of the bolster return means.

9. In a machine for cutting off lengths from continuously fed work which comprises (a) work feeding means, (b) a stationary frame having thereon a drive shaft, a cutter block movable vertically by said shaft, a continuously rotating element, a single impulse clutch for momentarily establishing an operative connection between the driven shaft and the element, (c) a horizontally slidable bolster in said machine having a work stop, a work ejector, and a vertically movable cutter thereon, (d) means automatically operable by said bolster after it has been advanced by the work to establish the clutch connection between the element and the shaft, so as to cause the cutter block to descend and to cause the cutter to cut off the work, and (e) means automatically operable by the drive shaft when it rotates to cause return of said bolster, and to operate the work ejector.

10. In a machine for cutting off lengths from continuously fed work which comprises (a) work feeding means, (b) a stationary frame having thereon a drive shaft, a cutter block movable vertically by said shaft, a continuously rotating element, a single impulse clutch for momentarily establishing an operative connection between the drive shaft and the element, (c) a horizontally slidable bolster in said machine having a work stop, and a vertically movable cutter thereon, (d) means automatically operable by said bolster after it has been advanced by the work to establish the clutch connection between the element and the shaft, so as to cause the cutter block to descend and to cause the cutter to cut off the work, and (e) means automatically operable by the drive shaft when it rotates to cause return of said bolster, and means automatically controlled by the bolster and operating to stop movement of said work feeding means in case the bolster over travels, due to the feeding of the work.

LOUIS C. SCHEURING.
JOHN G. KAY.